United States Patent
Matsumoto et al.

(10) Patent No.: US 6,377,580 B2
(45) Date of Patent: *Apr. 23, 2002

(54) APPARATUS FOR INTERFACING FACSIMILE AND COMPUTERS ON A LAN

(75) Inventors: Koichi Matsumoto, Tokyo; Masaaki Inde, Urawa; Yasunori Fujiwara, Tokyo, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/760,195

(22) Filed: Dec. 4, 1996

(30) Foreign Application Priority Data

Dec. 15, 1995 (JP) .............................................. 7-327204
Nov. 22, 1996 (JP) .............................................. 8-311984

(51) Int. Cl.⁷ .................................................. H04N 1/21
(52) U.S. Cl. ........................ 370/401; 709/205; 358/468
(58) Field of Search ...................... 340/825.06, 825.07; 370/254, 401; 395/200.34, 200.61, 200.67; 379/202; 709/206, 205, 224; 358/402, 405, 468

(56) References Cited

U.S. PATENT DOCUMENTS

| | | | | |
|---|---|---|---|---|
| 5,012,219 A | * | 4/1991 | Henry ................... | 340/825.44 |
| 5,307,346 A | * | 4/1994 | Fieldhouse ................... | 370/254 |
| 5,333,266 A | * | 7/1994 | Boaz ........................... | 709/206 |
| 5,400,331 A | * | 3/1995 | Lucak et al. ................ | 370/401 |
| 5,410,416 A | * | 4/1995 | Amberg et al. ............. | 358/405 |
| 5,461,488 A | * | 10/1995 | Witek ......................... | 358/402 |
| 5,552,901 A | * | 9/1996 | Kikuchi et al. ............. | 358/468 |
| 5,577,043 A | * | 11/1996 | Guo et al. ............. | 340/825.06 |
| 5,608,786 A | * | 3/1997 | Gordon ....................... | 370/401 |
| 5,675,507 A | * | 10/1997 | Bobo .......................... | 709/206 |
| 5,675,510 A | * | 10/1997 | Coffey ........................ | 709/224 |
| 5,696,606 A | * | 12/1997 | Sakayama et al. .......... | 370/401 |
| 5,757,669 A | * | 5/1998 | Christie ...................... | 709/205 |
| 5,767,985 A | * | 6/1998 | Yamamoto et al. ......... | 358/402 |

OTHER PUBLICATIONS

Microsoft Mail for PC Networks User's Guide, Microsoft Corporation, One Microsoft Way, Redmond, WA 98052–6399, 1992.*

* cited by examiner

Primary Examiner—Edwin C. Holloway, III
(74) Attorney, Agent, or Firm—Morgan & Finnegan, L.L.P.

(57) ABSTRACT

The present invention relates to a data communication apparatus which interfaces with a local area network (LAN), receives data from a transmission side, notifies a receiver on the LAN that the data was received and manages a plurality of data received individually for each notification destination. Notification that the plurality of individually-received data has been received is performed collectively. Thus, communication efficiency and communication traffic are improved even where a number of transmissions to the same destination and a number of receptions to the same destination are performed.

4 Claims, 17 Drawing Sheets

FIG. 8

| KIND OF MARKER | CODE WORD | MEANING |
|---|---|---|
| SOI | FFD8 | START OF IMAGE |
| EOI | FFD9 | END OF IMAGE |
| SOF0 | FFC0 | START OF BASE LINE FRAME |
| SOS | FFDA | START OF SCAN |
| DHT | FFC4 | DEFINITION OF HUFFMAN TABLE |
| DQT | FFD8 | DEFINITION OF QUANTIZATION TABLE |
| DRI | FFDD | DEFINITION OF RESET INTERVAL |
| COM | FFFE | COMMENT |
| DNL | FFDC | DEFINITION OF THE NUMBER OF LINES |

FIG. 9

| Com | Lc | $Cm_1$ ............ $Cm_{Lc-1}$ |
|---|---|---|

FIG. 16

| SYMBOL | MEANING |
|---|---|
| F | FILL DATA |
| A | ADDRESS DATA |
| C | CONTROL DATA |
| FCD | FACSIMILE CODING (ENCODE) DATA |
| FRAME NO. | FRAME NUMBER |
| FILE DATA | FILE DATA |
| FCS | FRAME CHECK DATA |

FIG. 17

| IDENTIFIER | LENGTH | CONTENTS | END-OF-CONTENTS |
|---|---|---|---|

IDENTIFIER : ID CODE

LENGTH : LENGTH OF CONTENTS

CONTENTS : CONTENTS

END-OF-CONTENTS : END CODE

APPARATUS FOR INTERFACING FACSIMILE AND COMPUTERS ON A LAN

BACKGROUND OF THE INVENTION

1. Field of the Invention

The present invention relates to a data communication apparatus and method for sending or transmitting data to a terminal connected to a local area network (LAN).

2. Related Background Art

Conventionally, a facsimile apparatus has been remarkably developed on the basis of international standards in the field of communication by International Telecommunications Union (ITU). That is, in the initial stage, the facsimile apparatus had been based on initial international standards Group 1 and Group 2. However, recently the facsimile apparatus has been based on an internal standard Group 3 (to be referred as G3 hereinafter) and thus developed all over the world. A G3 facsimile apparatus which is most popular at present is defined by ITU Recommendations T.4, T.30, T.5 and T.6 (previous CCITT Recommendations), and it is being planned that the G3 facsimile apparatus is further standardized with new functions in the future.

In recent years, according to a popularization of a personal computer and the like, it had been desired to connect the facsimile apparatus to a local area network (to be referred as LAN hereinafter) which connects a number of personal computers. By connecting the facsimile apparatus to the LAN, document data or the like produced by the personal computer on the LAN can be transmitted via the facsimile apparatus to a partner's apparatus in response to a transmission request from the personal computer, and data received by the facsimile apparatus can be transferred to the personal computer on the LAN.

However, conventionally, when the facsimile apparatus receives the transmission request from the personal computer on the LAN, the facsimile apparatus immediately transmits the data to the partner's apparatus. Furthermore, when the facsimile apparatus receives the data from the partner's apparatus, the facsimile apparatus transfers a reception notification for the received data to the personal computer on the LAN every time the data reception is performed. Therefore, there has been a problem that, if a number of transmissions to the same destination or a number of receptions to the same destination are performed, communication efficiency is seriously degraded. More particularly, there has been a problem that communication traffic in the LAN is seriously degraded.

SUMMARY OF THE INVENTION

An object of the present invention is to provide a data communication apparatus and method which eliminate the above-mentioned problems.

Another object of the present invention is to provide a data communication apparatus and method which can improve efficiency in the use of a line.

A further object of the present invention is to provide a data communication apparatus and method which can reduce a user's load of a terminal on a local area network (LAN).

A further object of the present invention is to provide a data communication apparatus and method which can perform a collective data transfer for each receiver on the LAN.

The above and other objects of the present invention will become apparent from the following detailed description when read in conjunction with the accompanying drawings.

BRIEF DESCRIPTION OF THE DRAWINGS

FIG. 8 is a view for explaining each marker included in the JPEG data stream;

FIG. 9 is a view showing structure of a comment marker;

FIG. 16 is a view for explaining contents of each frame code in the BFT data format;

FIG. 17 is a view showing file data included in the BFT data format;

DETAILED DESCRIPTION OF THE PREFERRED EMBODIMENTS (First Embodiment)

Hereinafter, the first embodiment of the present invention will be explained in detail with reference to the accompanying drawings.

Figure 1:
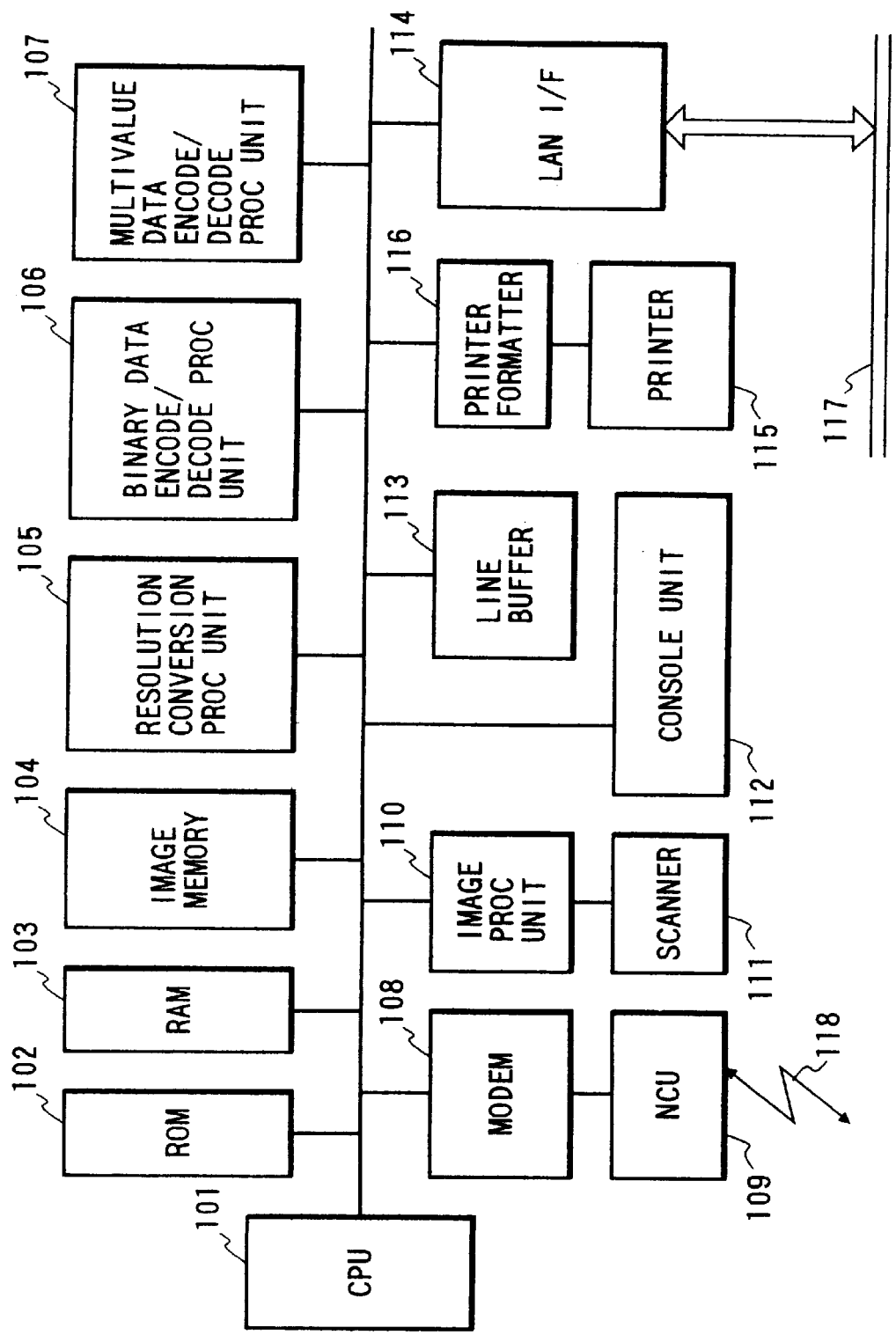
FIG. 1 is a block diagram showing a schematic structure of a facsimile apparatus according to a first embodiment of the present invention.

FIG. 1 is a block diagram showing a schematic structure of a facsimile apparatus according to the a first embodiment of the present invention.

A CPU 101 is a system control unit which controls the apparatus entirely.

A ROM 102 stores a control program of the CPU 101. A RAM 103 which is composed of an SRAM and the like stores data concerning program control change or the like. Further, a setting value registered by an operator, management data for the apparatus, buffer data for various works and the like are stored in the RAM 103. An image memory 104 which is composed of a DRAM and the like includes: a buffer memory for storing color image data corresponding to at least eight lines which data is represented by Red, Green and Blue (hereinafter "R", "G" and "B") color components; a buffer memory for storing color image data corresponding to at least two lines which data is represented by Cyan, Magenta, Yellow and Black (hereinafter "C", "M", "Y" and "K") color components; and a communication buffer corresponding to a partial page in an ECM (error correction mode) procedure defined by ITU-T Recommendations T.30 respectively in its independent areas. Furthermore, the image memory 104 includes areas which are used to classify the image data by a partner's telephone number and a client.

A resolution conversion process unit 105 controls resolution conversion such as millimeter-inch resolution conversion of raster data.

A binary data encode/decode process unit (white/black codec) 106 and a multivalue data encode/decode process unit (color codec) 107 perform encode and decode processes of the image data managed by the facsimile apparatus. The multivalue data encode/decode process unit 107 performs encode and decode in accordance with a known JPEG point photographic expert group) standard. JPEG is a still image compressing format and method which was provided by a committee of ISO and ITU-T that promotes standardization of image compression techniques. This format adopts non-reversible compression which is known as a high rate compression technique.

ITU-T Recommendations T.80 provides a method to introduce a JPEG encode system into a G3 -standard communication system. The JPEG encode system has been developed to effectively compress halftone image data in which one pixel is represented by multivalue (e.g., eight bits) data. However, in a general base line process, not the same as a conventional MMR encode system, it is known that the JPEG encode system is a non-reversible encode system. This is because the base line process in the JPEG encode system performs compression after executing an approximating process of raw image data (i.e., original image). Furthermore, according to this recommendation, communication of a color image or the like where information quantity is very large has become frequent. This recommendation also takes into account the communication with the computer, so that it can be performed including symbolized data which is more easily managed than the raw image data.

A modem (modulation/demodulation unit) 108 performs modulation and demodulation of transmission and reception signals of the facsimile apparatus. An NCU (network control unit) 109 has a function for transmitting a selection signal (i.e., dial pulse or tone dialer) to a communication line (PSTN) 118. The NCU 109 performs an automatic reception operation by detecting a calling sound and a line control operation.

A scanner 111 which is composed of a Contact Sensor (hereinafter "CS"; used for reading an image on a paper by scanning the paper), an original feed mechanism and the like optically reads an original image to separate it into Red, Green and Blue ("RGB") components (i.e., color elements for representing a color with an additive process, which is used for a monitor display) and then converts an each-color pixel into electrical image data (eight-bit multivalue data). The converted image data is subjected to a correction process by an image process unit 110 and then output as high-resolution image data.

A console unit 112 which is composed of a keyboard and the like is used by the operator to perform various input operations.

A line buffer 113 is a line buffer which is used to perform transfer control of the image data.

A LAN interface 114 is an interface which is to connect to a LAN 117. In this case, it is assumed that the LAN 117 in the present embodiment is a network according to a known TCP/IP protocol.

If a multivalue signal representing each of the Cyan, Magenta, Yellow and Black ("CMYK") components (i.e., color elements for representing a color with a subtractive process, which is used for a printer device or publishing) in a reception image or file data is input, a printer 115 (e.g., an ink-jet printer) converts each color data into binary data to perform a color print. A printer formatter 116 analyzes printer description language and converts it into the image data, in the case of printing the file data from a work station or the like.

Figure 2:
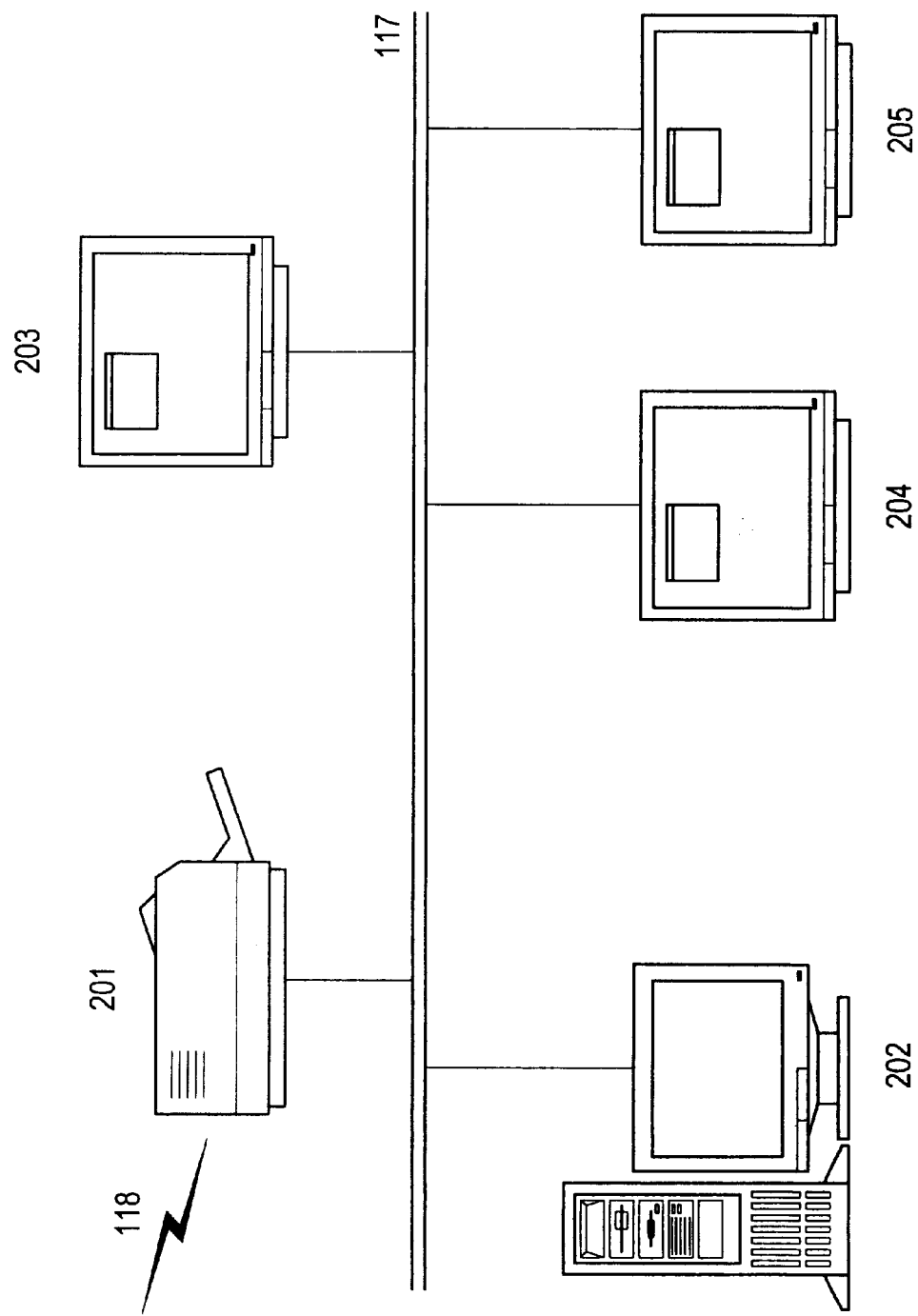
FIG. 2 is a view showing a network structure in a case where the facsimile apparatus shown in FIG. 1 is connected.

FIG. 2 is a view showing the structure of a network to which the facsimile apparatus shown in FIG. 1 is connected.

In FIG. 2, reference numeral 201 denotes the facsimile apparatus shown in FIG. 1. The facsimile apparatus 201 can transmit the data sent via the LAN 117 to a partner-side apparatus via the communication line 118, or can transfer the data received from the partner's apparatus via the communication line 118 to another apparatus via the LAN 117. Furthermore, the facsimile apparatus 201 can transmit and receive various information to and from the apparatus on the LAN 117. Reference numeral 202 denotes a server machine which is a computer for managing the LAN 117. Also, the server machine 202 functions as a file server for managing files on the LAN. Reference numerals 203 to 205 respectively denote client machines which are connected to the LAN 117. Each of the client machines 203 to 205 can transmit, after forming or producing various data (document data, image data, figure data and the like), the produced data or can receive various data. Furthermore, the client machines 203 to 205 can transmit or receive various information to or from other apparatuses on the LAN 117.

Figure 3:
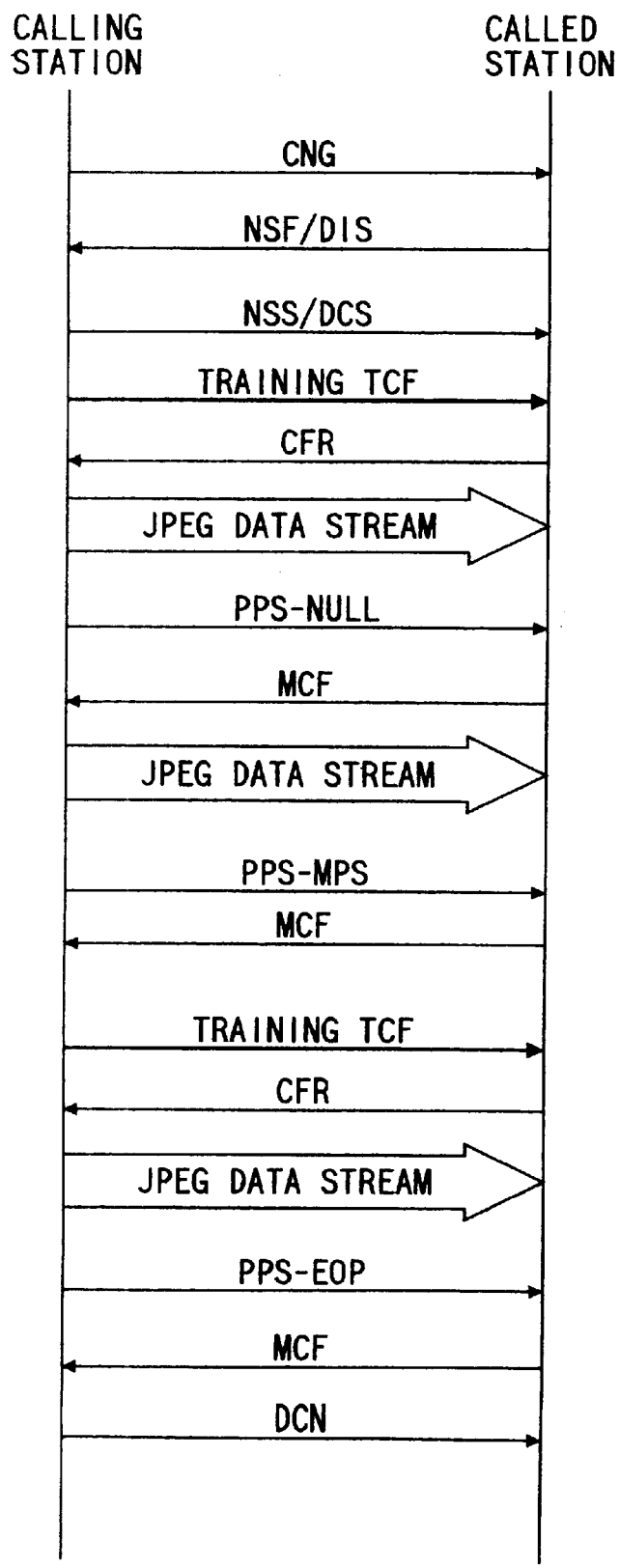
FIG. 3 is a view schematically showing a communication procedure according to the first embodiment.

FIG. 3 is a schematic view showing a communication protocol in the present embodiment.

FIG. 3 shows an example wherein the communication is performed by using a JPEG data stream which includes the image data corresponding to two pages respectively consisting of the two partial pages for the first page and one partial page for the second page. Although the structure of the JPEG data stream will later be described in detail, the structure essentially includes a comment marker and other markers.

In a case where the facsimile apparatus communicates with the partner's apparatus via the communication line 118, according to the ITU-T Recommendations, it is declared by using Non Standard Facilities ("NSF"; a signal which was standardized as T.30 recommended by ITU-T and that can notify a function which is particular to a manufacturer) and Non Standard Facilities ("NSS"; also a signal which was standardized as T-30, and is used for instructing a receiver by looking over NSF from a partner and selecting a communicable mode) signals to perform the communication by using the multivalue data (JPEG data stream) as well as transmitting the Digital Identification Signal ("DIS"; also a signal which was standardized as T-30, and is used for notifying a standard function provided by ITU-T) and Digital Command Signal ("DCS"; also a signal which was standardized as T-30, and is used for instructing a receiver by looking over NSF from a partner and selecting a communicable mode) signals.

In the present embodiment, since only the comment marker in the JPEG data stream of the first page is utilized, the JPEG data steam of the second page or following page does not include any comment marker.

Figure 7:
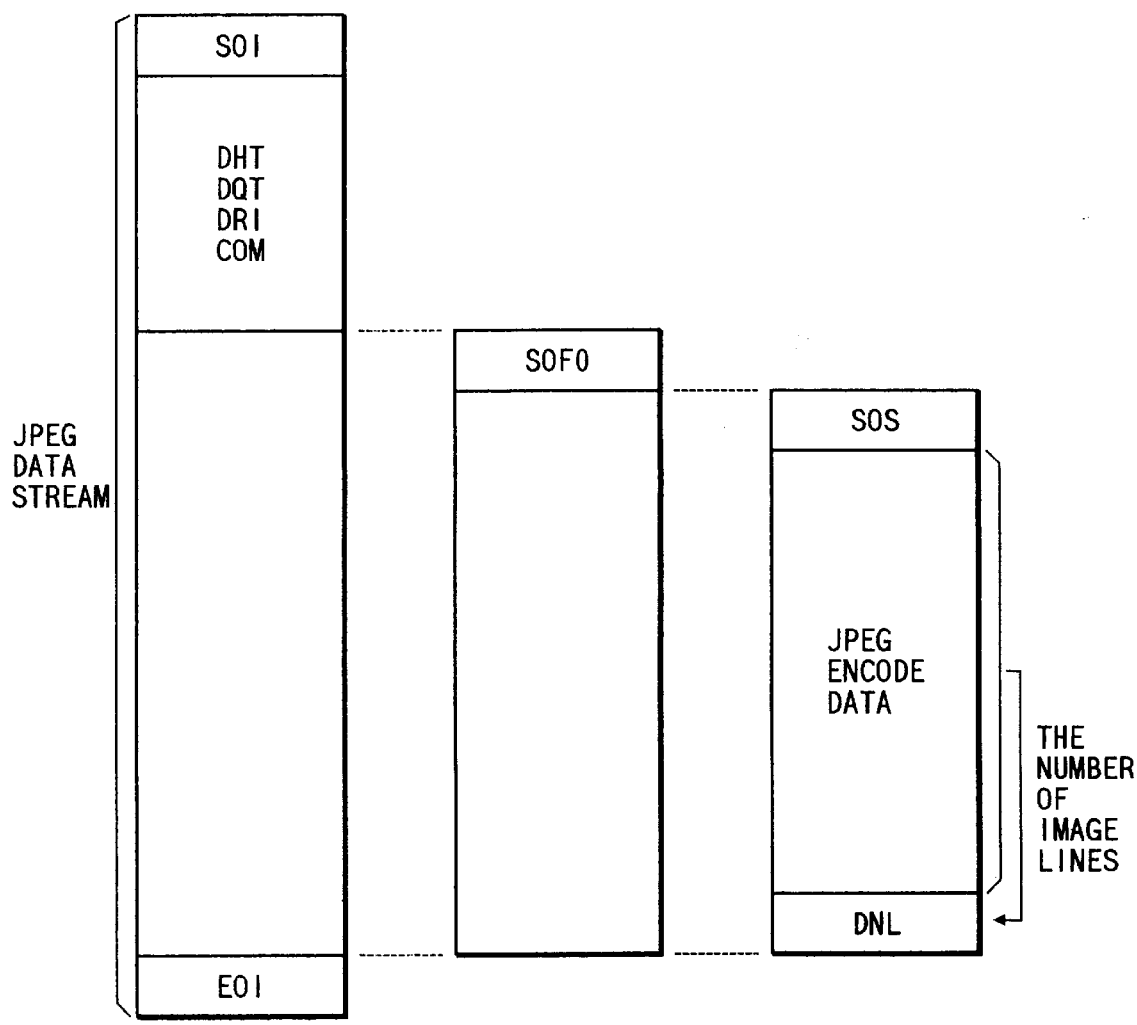
FIG. 7 is a view showing structure of a JPEG data stream.

FIGS. 7 to 9 are views each showing the structure of the JPEG data stream.

FIG. 7 shows the JPEG data stream entirely, and includes each marker and image data (JPEG encode data).

FIG. 8 shows the kind, code word and meaning of each marker included in the JPEG data stream.

FIG. 9 shows structure of the comment marker. In FIG. 9, reference symbol Com denotes a marker representing a comment start. Reference symbol Lc denotes a marker representing a comment segment table in 16 bits, and its allowable value is within a range of 2 to 65535 (decimal notation). Reference symbol $Cm_i$ denotes a comment byte represented in eight bits, and its allowable value is within a range of 0 to 255 (decimal notation). In the present embodiment, a user name and ID (individual information such as IP address, MAC address or the like) of each client connected to the LAN 117 has been previously set in the comment byte (Cmi) within the comment marker, and the set data is analyzed.

Figures 10A, 10B, 10C, 11:
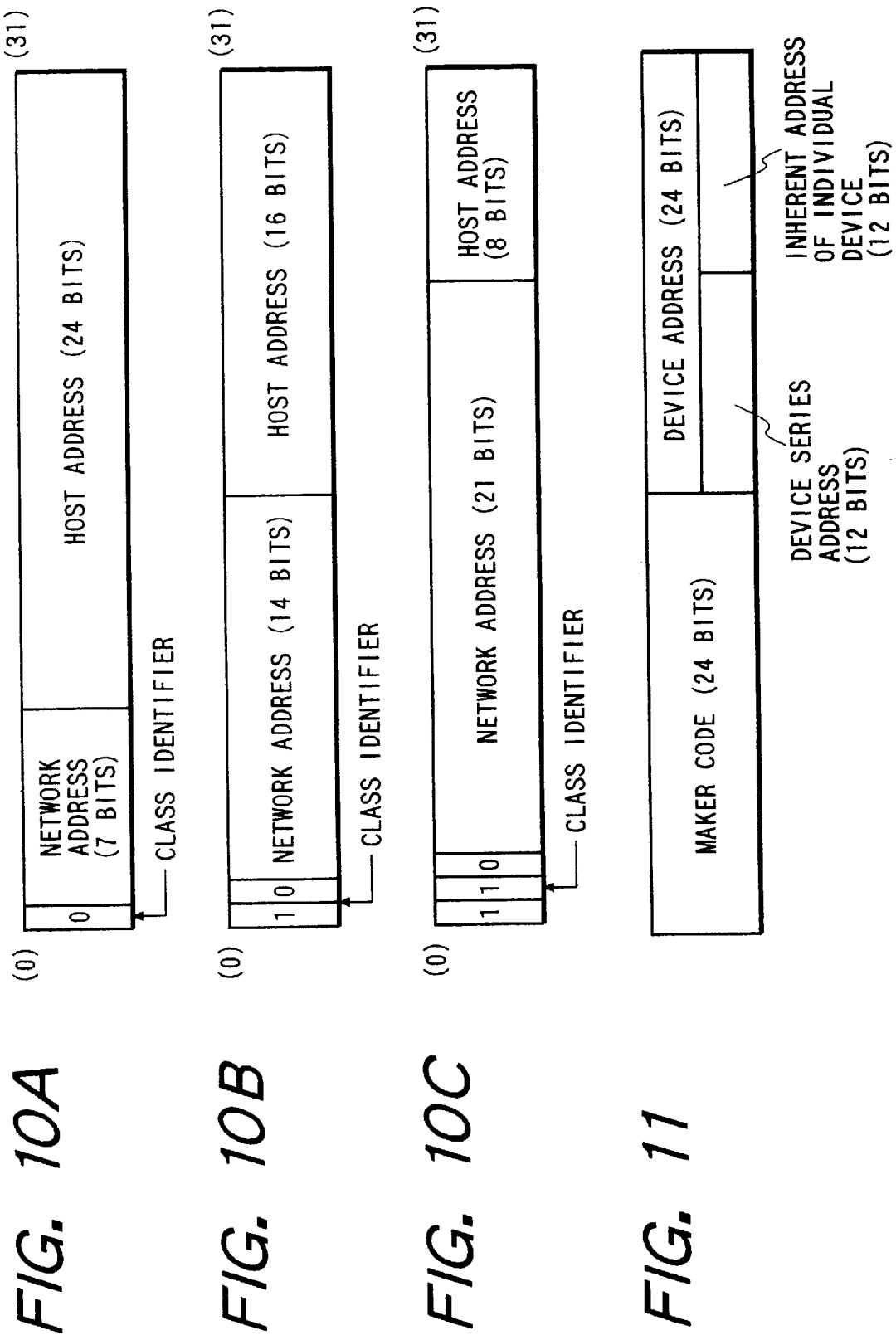
FIGS. 10A to 10C are views showing data structure of an IP address.
FIG. 11 is a view showing data structure of an MAC address.

FIGS. 10A to 10C are views showing the data structure of the IP address. The IP address which represents an address of a network segment is 32-bit address data consisting of a class identifier, a network address and a host address. The structure of the IP address differs in a class (i.e., A, B and C three classes). The class A (FIG. 10A) is used in a large-scale LAN (i.e., national-scale network), the class B (FIG. 10B) is used in a medium-scale LAN (i.e., network within company or university), and a class C (FIG. 10C) is used in a small-scale LAN. The number of bits constituting the network address and the host address differs in each class. Further, the network address represents a segment such as Ethernet or the like to which a host (terminal) is connected, and the host address is used to discriminate the host in each segment.

For example, in a case where the network address is 129.80 (class B) and the host address is 24.31, the IP address is (129.80.24.31) and actual data is (10000001 01010000 00011000 00011111).

FIG. 11 is a view showing data structure of the MAC address. The MAC address is an address which is allocated inherently to a piece of equipment connected to the LAN and managed according to IEEE (Institute of Electrical and Electronics Engineers). In the MAC address, upper 24 bits constitute a maker discrimination code, and the lower 24 bits are allocated to the apparatus in a maker. Usually, in the lower 24 bits, the upper 12 bits are allocated to a device series address and the lower 12 bits are allocated to a device single-body inherent address (serial number).

Figure 12:
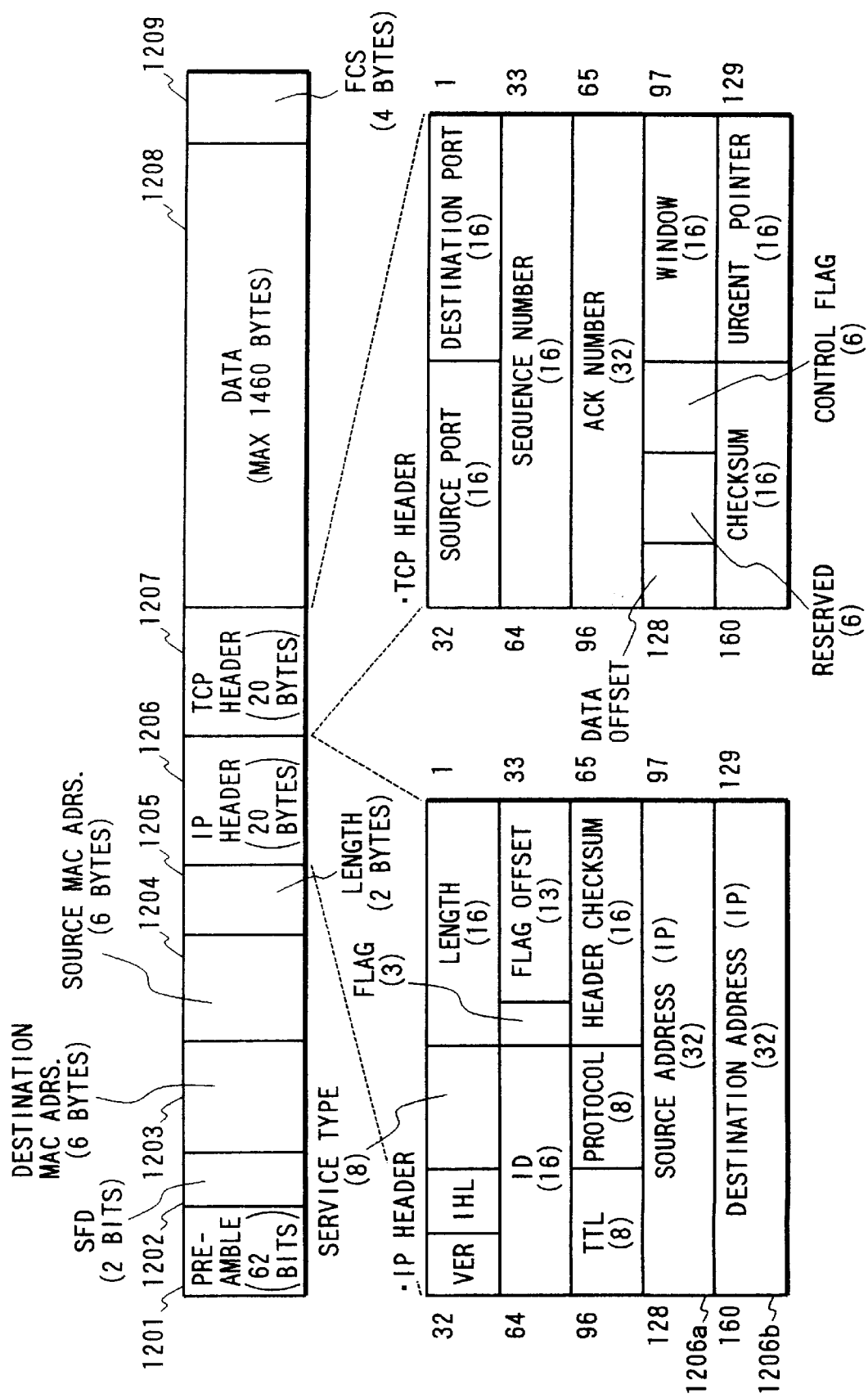
FIG. 12 is a schematic view showing structure of a TPC/IP protocol.

FIG. 12 is a view showing the packet structure of data used in the communication protocol according to the TCP/IP.

Reference numeral 1203 denotes the MAC address (six bytes) representing a data transmission destination, and reference numeral 1204 denotes the MAC address (six bytes) representing a data transmission source. This MAC address corresponds to a data link layer. Reference numeral 1206 denotes an IP header which corresponds to a protocol of a network layer. In this IP header 1206, an address for accessing the device on the network is set, and an IP address 1206a of the data transmission source and an IP address 1206b of the data transmission destination are stored.

Reference numeral 1207 denotes a TCP header which corresponds to a transport layer for defining securement of data transfer reliability.

Reference numeral 1208 denotes a data portion in which the image data, command data and the like are stored.

Hereinafter, an operation (referred to as series delivery notification control hereinafter) will be explained. In the series delivery notification control, each client on the LAN 117 is notified of a message that there is a reception image destined for the client, in order to collectively deliver (by a series delivery) to the same client the image data (i.e., image data received based on another call after disconnecting the communication line 118) which corresponds to a plurality of communications and was received via the communication line 118.

Figure 4:
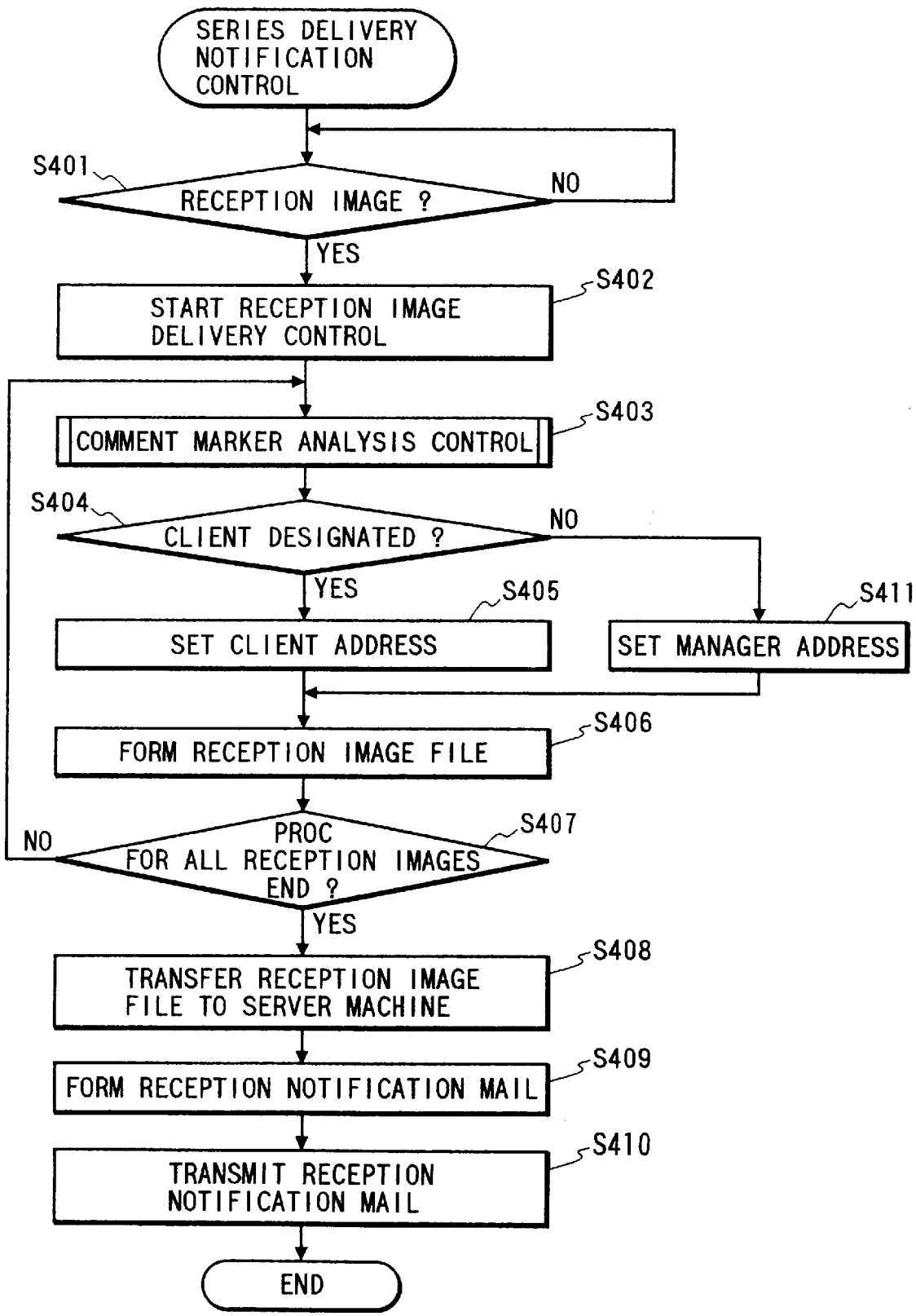
FIG. 4 is a flow chart showing a process flow of series delivery control according to the first embodiment.

FIG. 4 is a flow chart showing a process flow of the series delivery notification control. This flow chart represents a flow of control performed by the CPU 101 on the basis of the program stored in the ROM 102.

Initially, in step S401, it is judged whether or not the reception image data (a reception notification is not yet performed to the client on the LAN 117) has been stored in the image memory 104. In this case, such a judgment is performed at a predetermined interval. For example, by observing the elapsing of a predetermined time or a remaining capacity of the image memory 104, the judgment is performed every time an observed quantity reaches a predetermined quantity or when the image is received at predetermined times. Then, if it is recognized that the reception image has been stored in the image memory 104, the flow advances to step S402 to start a delivery control of the reception image.

Subsequently, in step S403, the comment marker in the data received from a transmission station is analyzed. However, in the transmission and reception (i.e., exchange) of the signal to and from the transmission station on the basis of the protocol shown in FIG. 3, it is assumed that the transmission station is notified that the communication is performed by the NSF and NSS signals using the JPEG data stream. In this case, the reception data has the structure shown in FIG. 7, and the comment marker is included in the structure. That is, the comment marker has been stored as the data in the comment byte having the structure shown in FIG. 9. In the present embodiment, at the transmission source, the address of the client on the LAN in a reception side and the like have been stored in the comment byte in the comment marker, in accordance with a predetermined format. The LAN in the present embodiment accords to the TCP/IP protocol, and the address of the client on the LAN in the reception side is the IP address representing the address on the LAN or the MAC address of the equipment connected to the LAN. In step S403, the address of the data stored in the comment byte of the comment marker is analyzed and then converted into a format of the IP address or the MAC address.

Subsequently, in step S404, the analyzed comment marker is judged. That is, if it is judged that there is a client designation in the comment marker, the flow advances to step S405 to set the IP address and the MAC address used for accessing the terminal on the LAN in accordance with the comment marker designated at the transmission source, and to store the set addresses in the RAM 103. On the other hand, if it is judged that there is no client designation in the comment marker, the flow advances to step S411 to judge as a partner-unknown area (e.g., station-stopping reception). Then, a client machine of a manager is designated and its address is set to be stored in the RAM 103. However, in a case where there is no client designation, an unnecessary direct-mail communication and the like may be prevented by cancelling the reception image. In this case, the manager is a network manager, a reception information manager or the like which has been previously determined in the reception side, and its address (i.e., name) has been stored in the RAM 103. However, a plurality of addresses can be registered even in such a case.

In step S406, a series image file for a series delivering the reception image to the terminal (i.e., client) on the designated LAN 117 is formed on the basis of the above set addresses. In the series image file, the reception images corresponding to the plurality of communications are collectively combined with others and classified by each client. The series image file has the structure according to the protocol of the connected LAN 117. In the present embodiment, the series image file has the structure according to the TCP/IP protocol. The series image file is composed of the MAC address, the IP header, the TCP header, a data portion and the like. The data portion corresponds to an application layer. Furthermore, in order to store the delivered image file at a position corresponding to the designated address (i.e., address which was set in steps S405 or S411) on the memory of the server machine 202, there are provided two files, i.e., a command data file for storing the information such as the designated address and the like and an image data file for storing the image data. Then, these two files are sent to the server machine 202 with information correlating them to each other. A control in the server machine 202 side for storing the file at a predetermined position on the memory is performed such that the server machine 202 is brought to an active state by a software application on the server machine 202 on the basis of the information of the command file and subsequently the data of the received image data file is stored at the predetermined position on the memory. In case of transmitting the file, the address of the server machine 202 is stored at the address to which the file is sent, and the address of the facsimile apparatus 201 is stored at the address from which the file is sent. Then, if it is judged that the formation of series image files terminates for all of the reception images within the image memory 104 in such a manner as above (step S407), the series image file in which the reception images corresponding to the plurality of communications are collectively combined with others classifying them into the above, each address (address which was set in the step S405 or S411) is sent to the LAN 117 via the LAN interface unit 104 of the facsimile apparatus 201 and then transferred to the server machine 202 (step S408).

After the series image file is sent to the server machine 202, a reception notification mail is formed, notifying that the reception was performed, to the client corresponding to the designated address (i.e., address which was set in the step S405 or S411) (step S409). The reception notification mail is composed of communication information and a message informing that the reception was performed according to a predetermined format. In the communication information, information concerning the reception time of each reception image, the reception partner's information, information concerning the number of receptions and the like corresponding to the plurality of communications are combined with others. Then, the reception notification mail is transmitted to the terminal corresponding to the designated terminal (i.e., address which was set in the step S405 or S411) (step S410). In this case, such a reception notification may be performed by using a conventional mail tool.

Needless to say, a broadcasting series communication can be performed on the same network if a plurality of client IDs have been set in the comment marker at the transmission side.

Furthermore, if it is judged in step S404 that the client has not been set by the comment marker, the delivery control is not performed. Instead, like an ordinary reception operation, the reception image may be automatically output from the printer unit 115. Moreover, if the client has not been designated and the manager has not been set in the reception side, the reception image may be printed out.

The client (i.e., terminal) which received the reception notification mail sent in step S410 fetches the image file from the server machine 202 to display it on a display apparatus for confirmation, or prints out the fetched image file on a recording paper by a printer or the printer unit 115 of the facsimile apparatus 201, so that the client obtains the reception image. In this case, each of the plurality of image files which have been combined may be individually designated to the output.

The following is an explanation of an operation (referred to as a series delivery control hereinafter) where the communication data corresponding to the plurality of communication received via the communication line 118 are collectively and directly delivered to the same client on the LAN 117.

Figure 5:
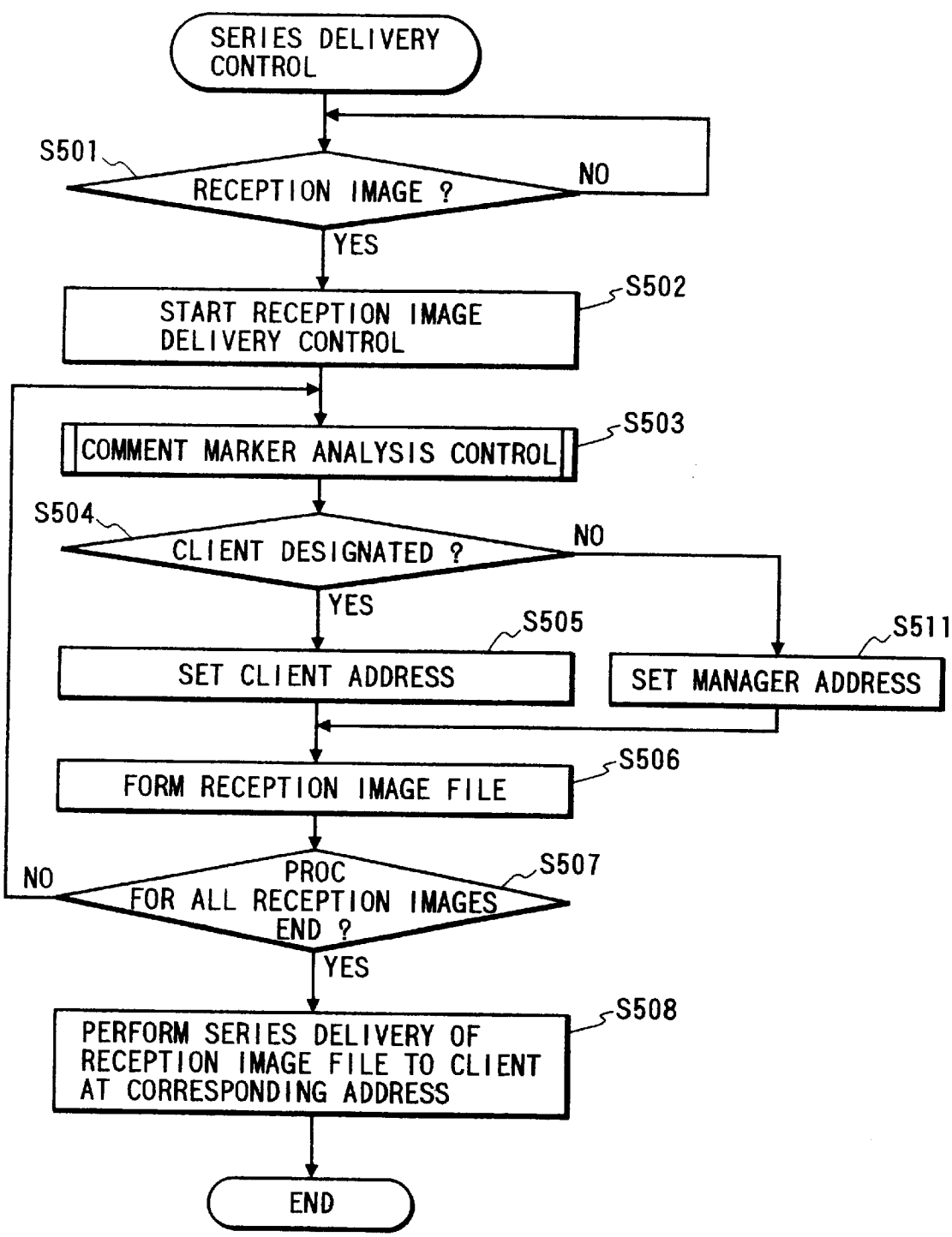
FIG. 5 is a flow chart showing a process flow of series delivery control according to the first embodiment.

FIG. 5 is a flow chart showing a process flow of the series delivery control. This flow chart represents a flow of control performed by the CPU 101 on the basis of the program stored in the ROM 102.

In FIG. 5, the contents of steps S501 to S507 and S511 are respectively the same as those of steps S401 to S407 and S411, and thus the detailed description of these steps is omitted. However, in the command data file, information such as address information for directly storing the series image file at a position corresponding to a predetermined address on the memory of the client machine on the LAN 117 is stored. When sending the file, the address of each client is stored at the address to which the file is transmitted, and the address of the facsimile apparatus 201 is stored at the address from which the file is transmitted. When formation of the series image file terminates for the all reception images within the image memory 104, the series image files collectively combined for each address (i.e., address which was set in the step S505 or S511) are delivered to the client machine corresponding to the address after the reception notification (step S508).

The following is an explanation of an operation in a case where the image data concerning the plurality of transmission requests are collectively transmitted (i.e., in a series transmission manner) for each client of the transmission destination when the transmission image sent from the client (i.e., terminal) on the LAN 117 is transmitted via the communication line 118.

Figure 6:
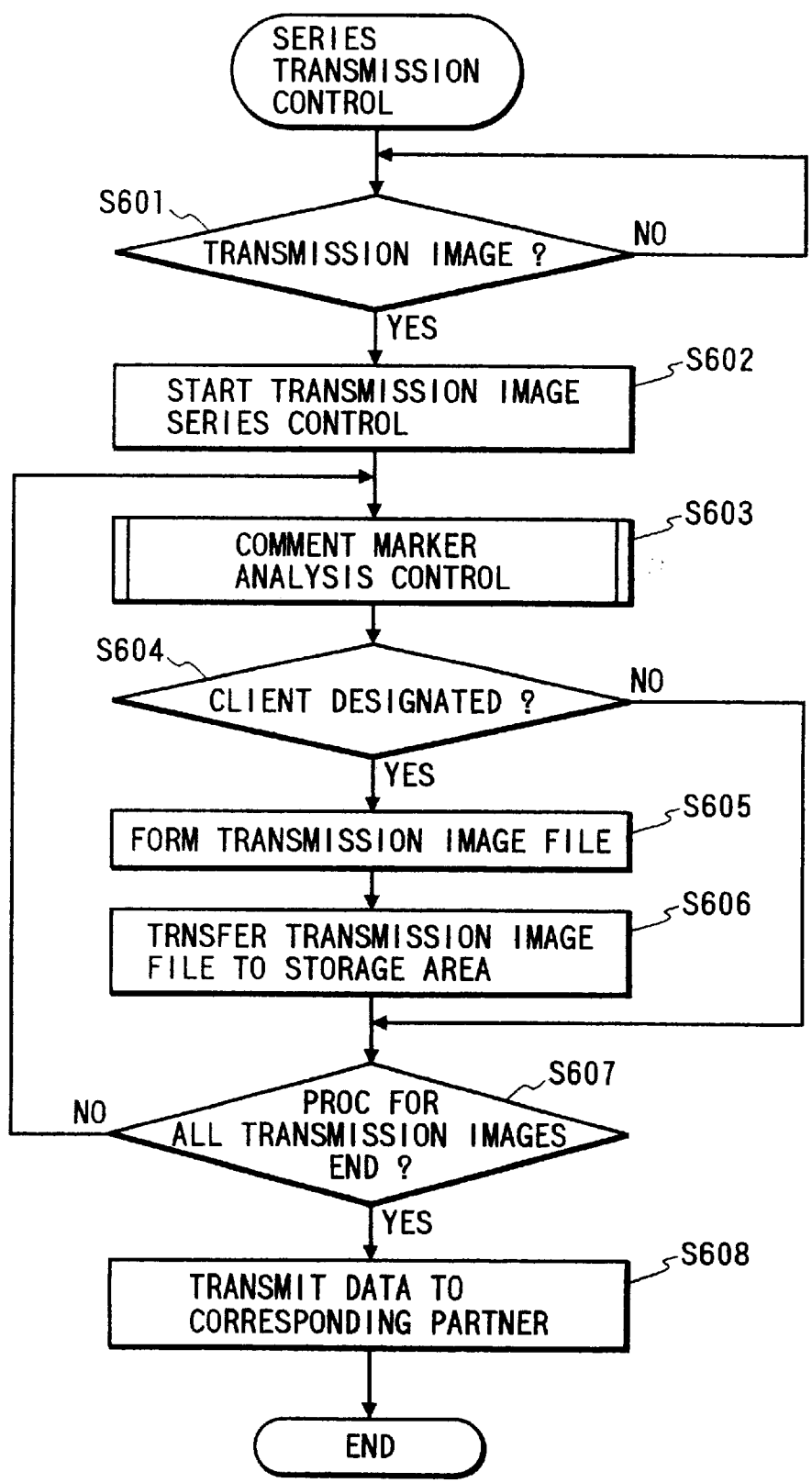
FIG. 6 is a flow chart showing a process flow of series transmission control according to the first embodiment.

FIG. 6 is a flow chart showing a process flow of such a series transmission control. This flow chart represents a flow of control performed by the CPU 101 on the basis of the program stored in the ROM 102.

Initially, in step S601, it is judged whether or not the image data to be transmitted has been stored in the image memory 104. In this case, such a judgment is performed at a predetermined interval. For example, by observing the elapsing of a predetermined time or a remaining capacity of the image memory 104, the judgment is performed every time an observed quantity reaches a predetermined quantity or every time image transmission is received a predetermined number of times and the received image is input into the image memory 104. Then, if it is recognized that the transmission image has been stored in the image memory 104, the flow advances to step S602 to start the series control of the transmission image.

Subsequently, in step S603, the comment marker in the transmission image data within the image memory 104 is analyzed. In this case, such analysis of the comment marker is the same as that previously explained. Then, in step S604, if it is judged that there is a designation of the client (i.e., client on the LAN in the partner's side) in the comment marker, the flow advances to step S605 to form a transmission image file independently for each address of the client. In this case, the transmission images concerning the plurality of transmission requests from the plurality of operators are sequentially combined with others collectively for the same client's destination to form the transmission image file. Then, in a step S606, the formed transmission image file is transferred to a storage area in the image memory 104 which area is provided for each partner (i.e., telephone number of partner's communication apparatus connected to the communication line 118). However, such the partner's telephone number is notified when the transmission request is received from the client. Then, in a step S607, if it is judged that formation of the transmission image file for the all transmission image data in the image memory 104 terminates, the flow advances to a step S608 to sequentially start transmission to the partner on the basis of the partner's telephone number. In this case, it is notified that the series transmission was performed, to each client of the partner and the client of the transmission source which performed the transmission request. On the other hand, if it is judged in the step S604 there is no designation of client, the transmission image file is transferred to the storage area in the image memory 104 to perform the transmission based on the partner's telephone number. The transmission in the step S608 is to sequentially transmit the transmission image files which have been collectively combined with others for each client on the destination in one communication for each partner (without disconnecting the line on the way).

Figure 13:
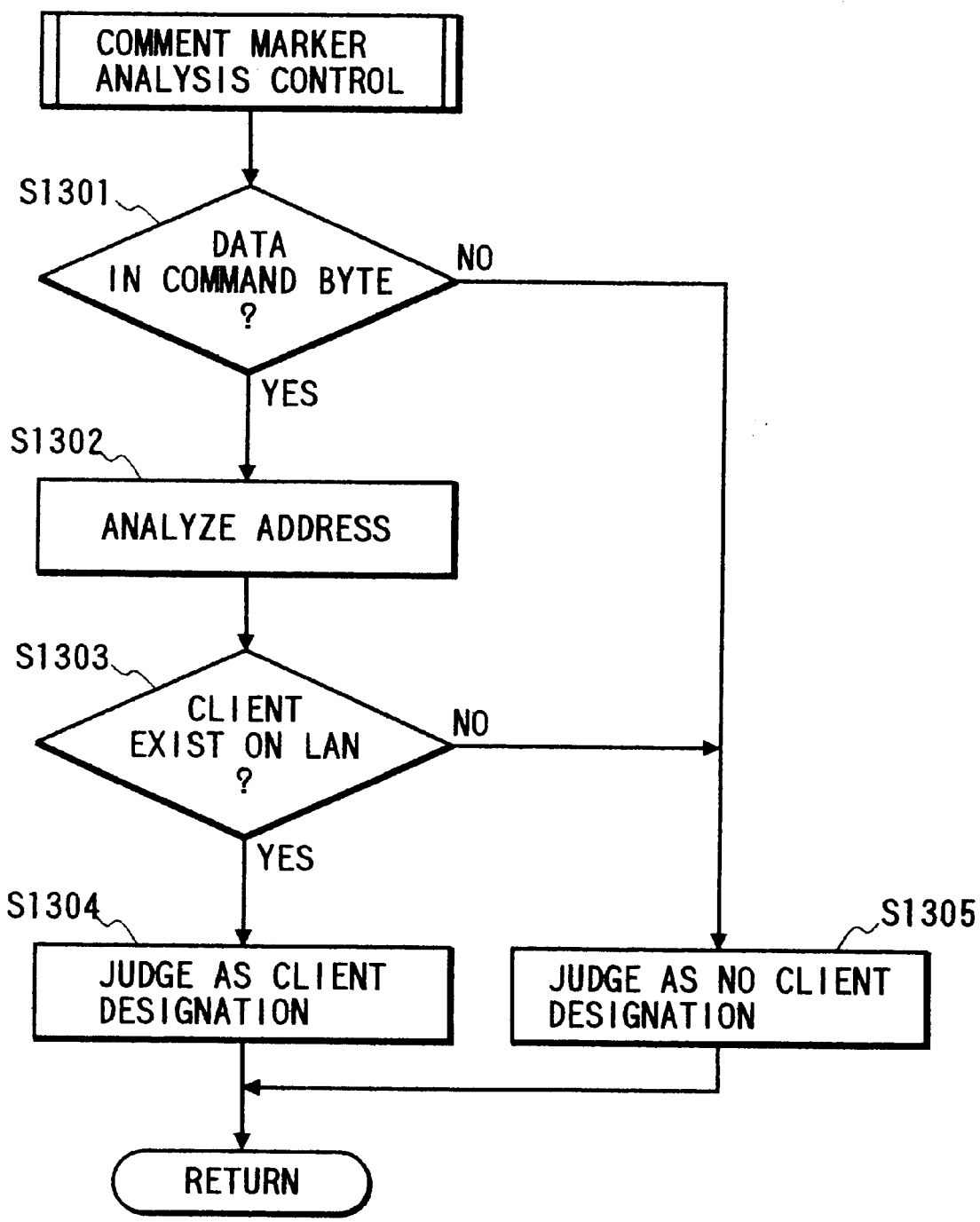
FIG. 13 is a flow chart showing a process flow of comment marker analysis control.

Finally, the comment marker analysis control is explained in steps S403, S503 and S603. FIG. 13 is a flow chart showing a process flow of the comment marker analysis control.

Initially, in step S1301, it is judged whether or not the data has been stored in the command byte of the comment marker in the JPEG data stream. If the data has not been stored in the command byte, it is judged that the address analysis is impossible. Then, in step S1305, it is judged that the client has not been designated, and the address analysis control terminates.

If it is judged that the data has been stored in the command byte, the flow advances to step S1302 to analyze the address data included in the data. In the present embodiment, since the address analysis accords to the TCP/IP protocol, two kinds of address data of the IP address and the MAC address are judged and the data structure of the respective address data is analyzed.

Subsequently, in step S1303, it is judged whether or not the client corresponding to the analyzed address exists on the LAN (i.e., connected to the LAN). In step S403, such judgment is performed by querying the server machine 202 of the existence of the client. In step S503, such judgment is performed by previously registering the client existing on the LAN 117 into the RAM 103 and then searching the contents thereof. In step S603, such judgment is performed by previously registering the client on the LAN for each partner into the RAM 103 and then searching the contents thereof. Then, if it is judged that the client exists on the LAN, the flow advances to step S1304 to judge whether there is a client designation. On the other hand, if it is judged that the client does not exist, the flow advances to step S1305 to judge that there is no client designation.

In the present embodiment, the example is of a structure wherein the facsimile apparatus 201 is directly connected to the LAN 117. However, the present invention is not limited to such a structure. That is, for example, it may be applied to a structure wherein a facsimile server is connected to the LAN 117 and then the facsimile server and the facsimile apparatus are connected to each other such that the above-described process program is installed in the facsimile server causes the server to control delivery and the like. By such a structure, the facsimile apparatus can improve a throughput for the communication control via the communication line.

Furthermore, it was explained the case where the mail notification control (steps S409 and S410) is performed by the facsimile apparatus 201 was explained. However, for example, the server machine 202 may form the notification mail by the software application to transmit it.

Furthermore, it was explained that the series image file based on the received image data is sent to the server machine 202 (step S408). However, the present invention is not limited to such an operation. That is, the series image file may be stored in the memory of the terminal connected to the LAN, a hard disk connected to the LAN, a hard disk connected to the facsimile apparatus, or the like.

Furthermore, it was explained as the example that the protocol of the LAN accords to the TCP/IP. However, the present invention is not limited to this. That is, a protocol may accord to IPX/SPX or the like.

Furthermore, the process is not limited to only the successful reception notification mail but also, e.g., an error notification mail in a case where a communication error is generated.

Furthermore, the comment marker may include not only the address data but also other data, e.g., print request data and the like.

As explained above, according to the present embodiment, the reception notification can be performed at one time that, from among the data received by the plurality of communications, the data to be sent to the same client can be collectively delivered to such the client. Further, the data can be collectively combined with others and delivered at one time. Therefore, communication efficiency and the like can be improved.

Furthermore, in a case where the data is transmitted to the partner's communication apparatus connected to the LAN, all of the data can be transmitted in one communication, and also the data for each destination client can be collectively transmitted. Therefore, communication efficiency and the like can be improved. Furthermore, even if the reception side does not have any series delivery function, the data can be transferred with collecting them for each client.

(Second Embodiment)

An explanation of transmission and delivery methods in a case where a BFT communication system is used is set out hereinafter.

The BFT communication system has been regulated based on ITU Recommendations T.30 and T.464, and standardized as a method for defining mutual connection and compatibility between different types of apparatuses in a wide range. Data in the BFT communication system is composed of an attribute portion and an image data portion, and also is composed of an indication called as a tag and information representing its contents. In the data, attribute information and data information can be set. Further, in the BFT communication system, it can be used not only as image data but also as code data.

Since the structure of a facsimile apparatus according to the present embodiment is the same as that in the first embodiment, the explanation thereof is omitted. The facsimile apparatus according to the present embodiment can transmit and receive (i.e., exchange) the data to and from a terminal on a LAN.

Figure 14:
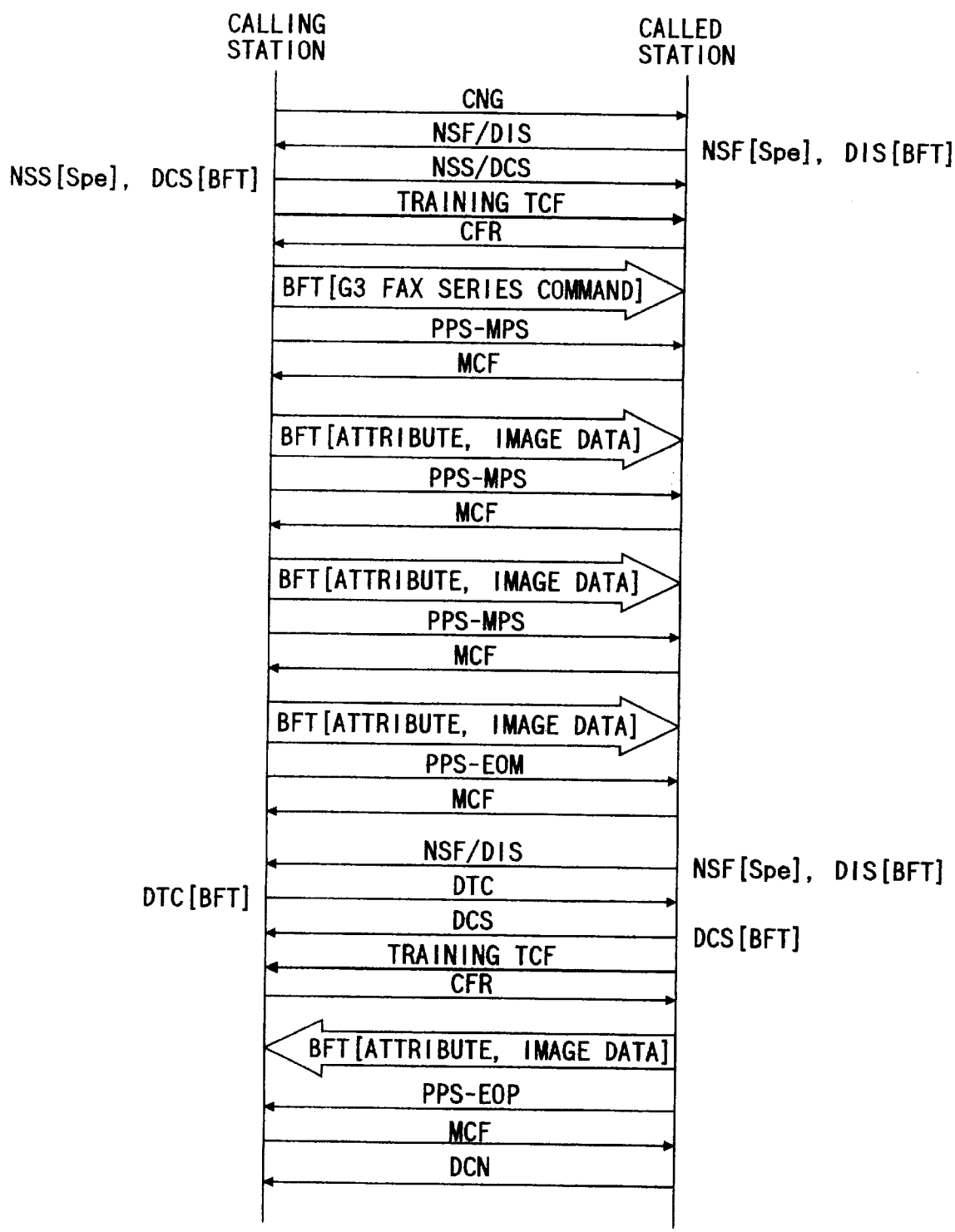
FIG. 14 is a schematic view of a communication procedure according to a second embodiment.

FIG. 14 is a schematic view showing a communication protocol (via the communication line 118) according to the present embodiment.

As shown in FIG. 14, a calling station can see by a procedure signal NSF that a called station has a special function concerning the present embodiment, and also see by a DIS signal that the called station utilizes the BFT communication system. Then, the calling station notifies the called station such that the called station executes the special function using the BFT communication system, by NSS and DCS signals.

The calling station sends a command for designating a series delivery to the called station, in accordance with a format based on the BFT communication system. Then, when the calling station receives an MCF signal from the called station, the calling station transmits a plurality of documents as files for respective destinations.

On the other hand, although not shown in the drawings, in a case where the called station does not have a series delivery control function, the calling station transmits the plurality of documents as a single file for each client.

Figure 15:
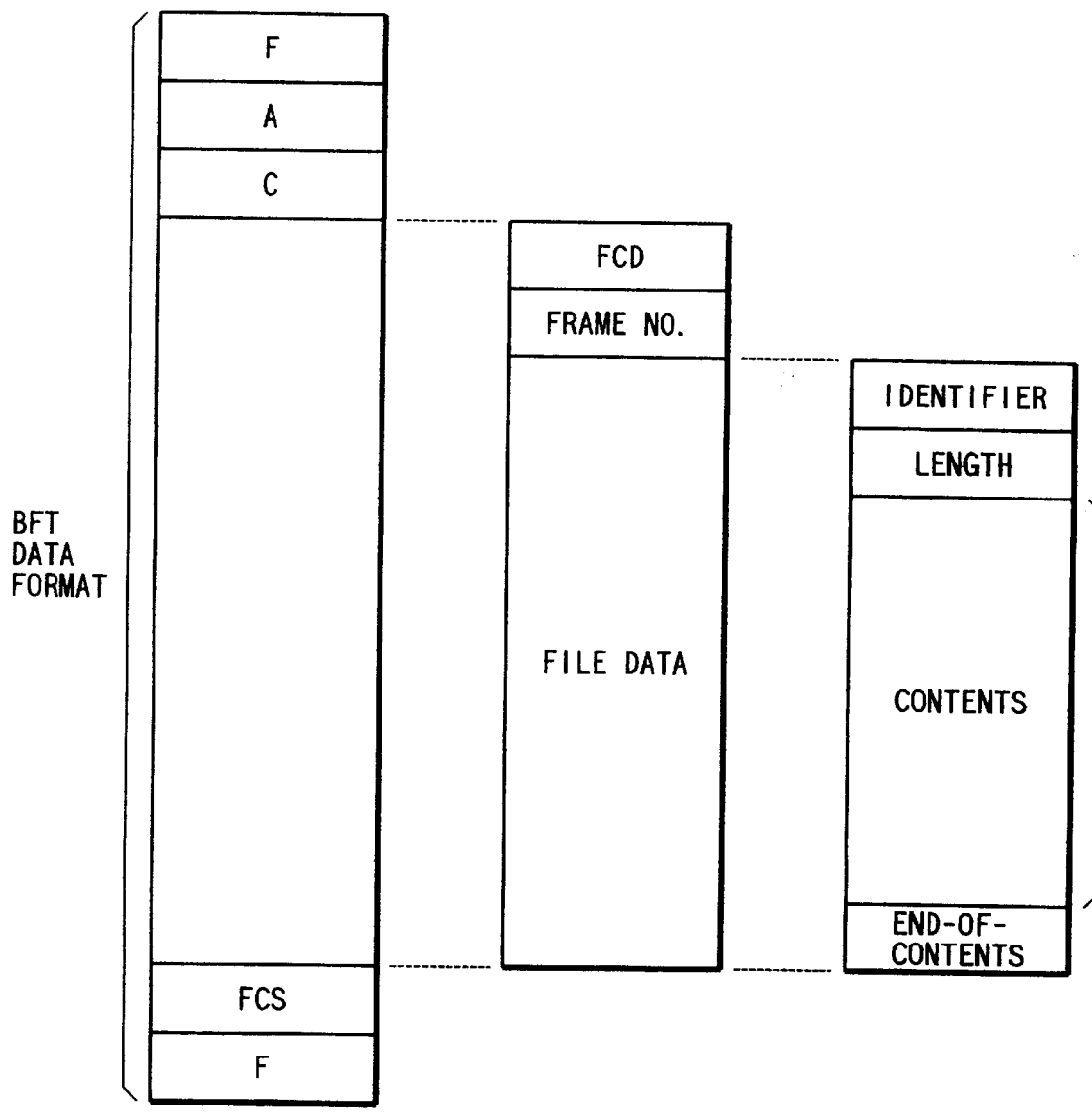
FIG. 15 is a view showing a BFT data format.

FIGS. 15 to 17 are views for explaining the structure of a data frame used in the BFT communication system (to be referred as BFT communication frame hereinafter).

FIG. 15 is the view showing the entirety of the BFT communication frame, FIG. 16 is the view showing contents of symbols included in the BFT communication frame, and FIG. 17 is the view showing structure of file data.

A user name and ID (individual information such as IP address, MAC address and the like) of each client connected to the LAN, the image data, and the like, are classified by using the tags, and set in "contents" shown in FIG. 17.

An explanation of an operation in a case where data concerning a plurality of transmission requests are collectively transmitted (i.e., in a series transmission) when the data sent from the client (terminal) on the LAN 117 is transmitted via the communication line 118 is set out hereinafter.

Figure 18:
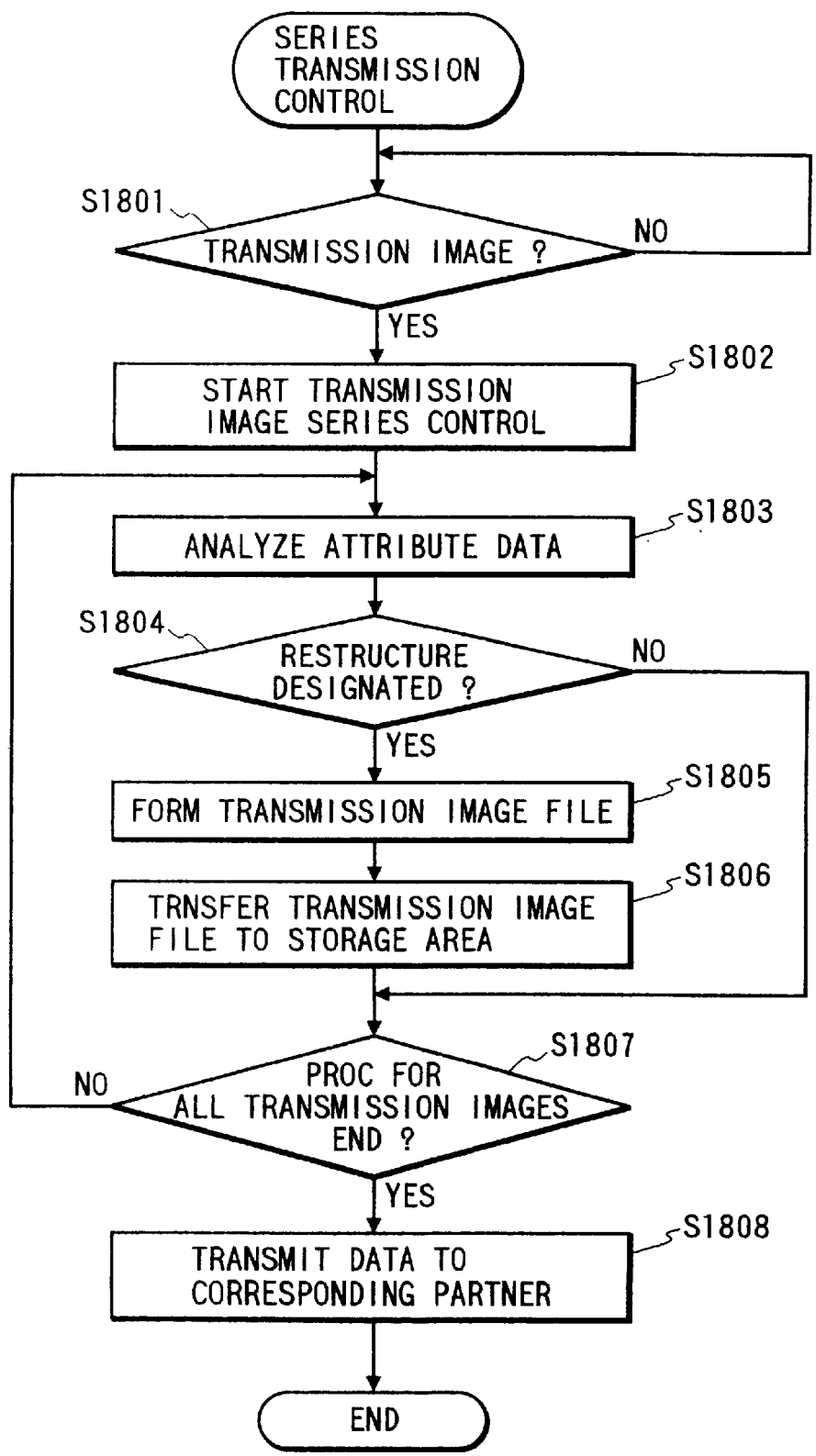
FIG. 18 is a flow chart showing a process flow of series transmission control according to the second embodiment.

FIG. 18 is a flow chart showing a process flow of a series transmission control using the BFT communication system. The flow chart represents a flow of control performed by the CPU 101 on the basis of a program stored in the ROM 102.

Initially, in step S1801, it is judged whether or not the image data to be transmitted has been stored in the image memory 104. In this case such a judgment is performed at a predetermined interval. For example, by observing the elapsing of a predetermined time limit or a remaining capacity of the image memory 104, the judgment is performed every time an observed quantity reaches a predetermined quantity, or every time image transmission is received a predetermined number of times. Then, if it is recognized that the transmission image has been stored in the image memory 104, the flow advances to step S1802 to start the series control of the transmission image.

Subsequently, in step S1803, the data in the image memory 104 is analyzed. That is, contents of the BFT data from are analyzed. Then, in step S1804, if it is judged that a command designating restructure is included in the contents, the flow advances to step S1805.

In step S1805, the BFT data frame is divided into control information (IP address or the like) and image information, and a transmission image file is formed in which the control information and the image information are in turn correlated to each other by a frame number or the ID. Then, in step S1806, the transmission image file is stored in a storage area in the image memory 104, which area is provided for each partner (i.e., telephone number of partner's apparatus via the communication line 118), distinguishing the file into the control information and the image information.

In step S1807, it is judged whether or not the process terminates for all of the image files to be transmitted in the image memory 104. If it is judged that the process terminates, the flow advances to step S1808 to generate a call and transmit to the partner the data in the image memory 104 as a BFT data format.

On the other hand, if there is no designation of restructure from the client in step S1804, the data received from the client are serially stored in the storage area corresponding to the partner in image memory 104. Then, in the step S1808, the stored data are transmitted as the BFT data format. In this case, the transmission is divisionally performed for each data, but the line is not disconnected on the way.

As described above, the data concerning the plurality of transmission requests from the one or more clients can be collectively transmitted. Further, by restructuring the data in such a manner, as in steps S1805 and S1806, the reception side comes to be able to easily perform a series notification control and series delivery control, both described later.

Figure 19:
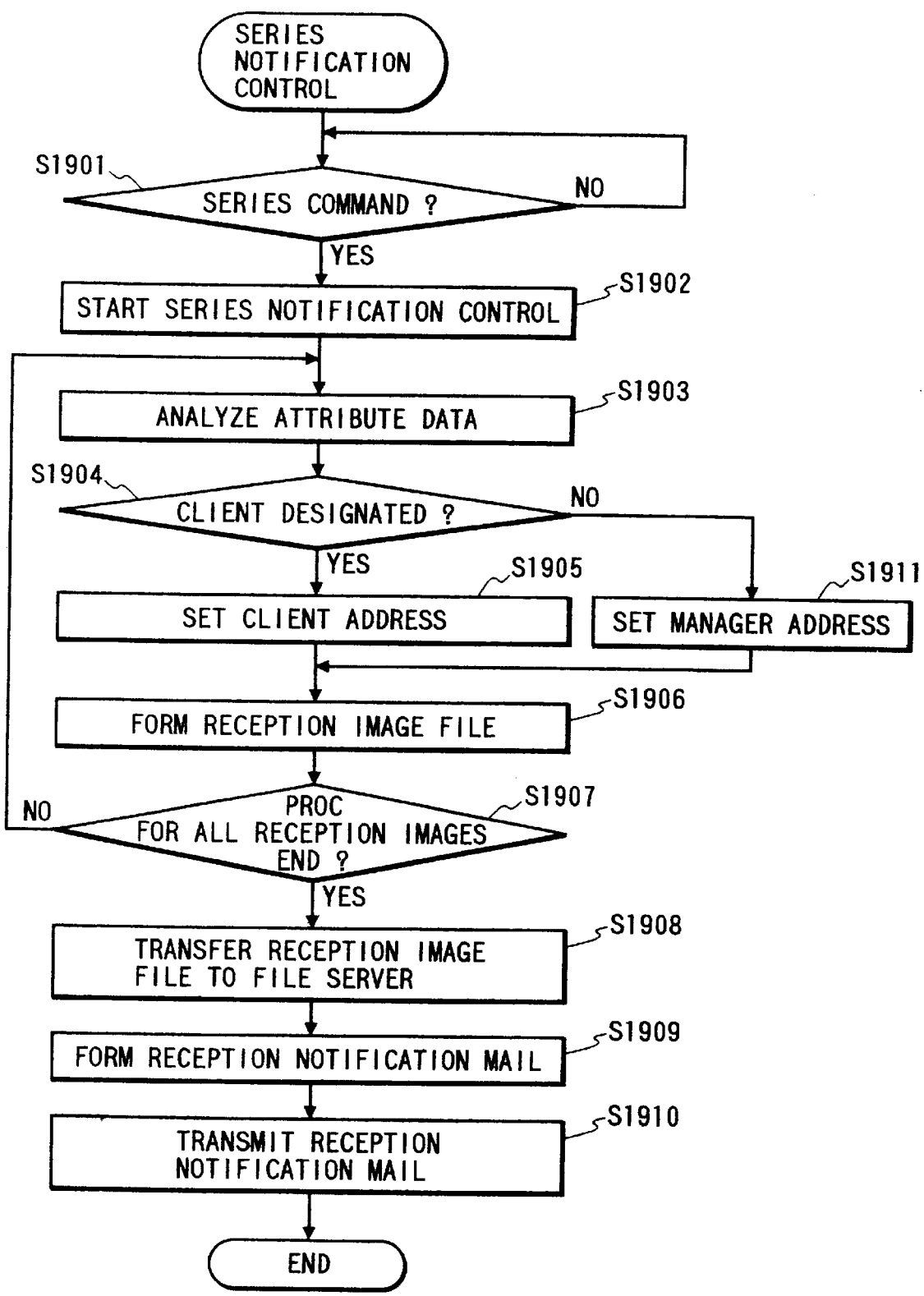
FIG. 19 is a flow chart showing a process flow of series notification control according to the second embodiment.

An explanation of the series notification control in which the reception of the plurality of data is collectively notified, with reference to FIG. 19 is set out hereinafter.

FIG. 19 represents a flow of control performed by the CPU 101 on the basis of a program stored in the ROM 102.

Initially, in step S1901, it is judged whether or not a series command is received from the transmission side via the communication line 118. Then, if received, the flow advances to step S1902 to start the series notification control.

In step S1903, the received data is analyzed, and it is judged in step S1904 whether or not there is a designation of the client. If there is such a designation of the client, the flow advances to step S1905 to set the IP address or the MAC address corresponding to the designated client. On the other hand, if there is no designation of the client, the flow advances to step S1911 to set an address of a previously-registered manager. In this case, where there is no designation of the client, such a state is judged as an error state, whereby an error notification may be sent to the transmission source to cancel the reception image.

Subsequently, in step S1906, an image file, which was distinguished into each client, is formed.

The image file is structured according to the protocol of the connected LAN. In the present embodiment, the image file is structured according to the TCP/IP protocol. The image file is composed of the MAC address, the IP header, the TCP header, the data portion, and the like. The data portion corresponds to an application layer. In the present embodiment, in order to store the delivered image data at a position corresponding to the designated address on the memory of the file server, two files are transmitted, i.e., a command data file for storing information, such as the designated address, and an image data file, for storing the received image data. When the file server stores the data at the predetermined position, the file server comes to be in an active state by the software application installed in the file server on the basis of the information of the command file, and the data of the received image data file is stored at the predetermined position on the memory. In this case, the address of the client of the transmission destination corresponds to the address of the file server storing the data. Further, the data is stored by correlating the telephone number of the transmission source and its address with each other.

Then, in step S1907, if it is judged that the process for the received image file terminates as a whole, the flow advances to step S1908, to transfer the image file to the file server (i.e., server machine 202) and cause the file server to store the file in such a manner as described above.

Subsequently, in step S1909, a reception notification mail for notifying the set client of the data reception is formed. In this case, the formed reception notification mail includes a message notifying of the data reception, a reception time for each file, partner's information, the number of reception pages, and the like.

In step S1910, the single reception notification mail representing the information corresponding to the plurality of files is transmitted to the designated client.

The client who received the reception notification mail in such a manner as above can receive all the reception data collectively, if necessary, or can receive the image data by designating the necessary file.

If there is no designation of the client in step S1904, the image may be printed out by the printer 115.

An explanation of an operation (i.e., series delivery control) in a case where the image data, which correspond to the plurality of files and were received via the communication line 118, are collectively delivered to the client on the LAN 117 is set out hereinafter.

Figure 20:
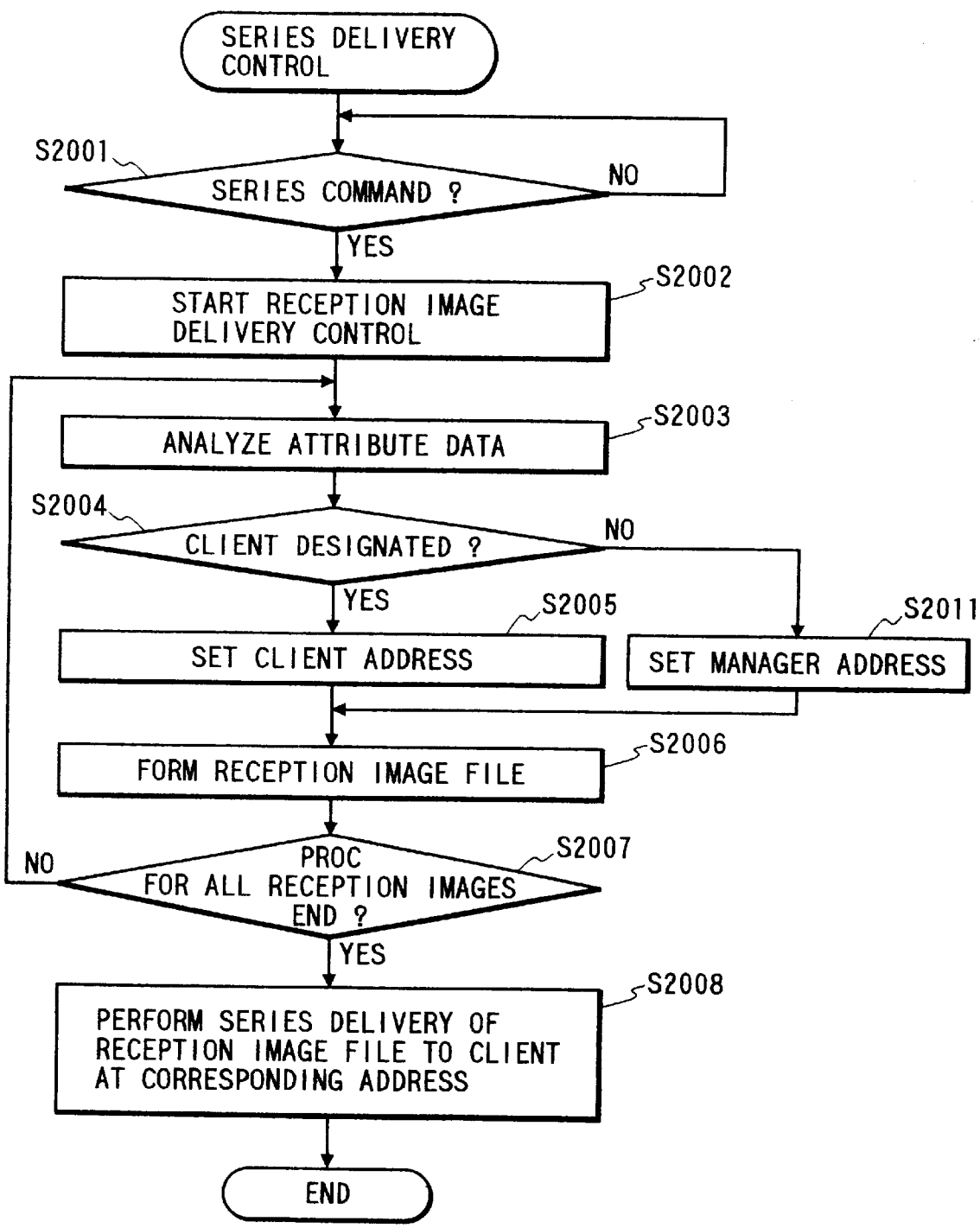
FIG. 20 is a flow chart showing a process flow of series delivery control according to the second embodiment.

FIG. 20 is a flow chart showing a process flow of the series delivery control. This flow chart represents a flow of control performed by the CPU 101 on the basis of a program stored in the ROM 102.

The contents of steps S2001 to S2007 and S2011 are substantially the same as those of steps S1901, to S1907 and S1911, therefore, the detailed explanation thereof is omitted.

In step S2008, the plurality of image files are collectively delivered to each designated client. Then, if the image file can be normally delivered to the client, the image file in the image memory 104 is deleted.

On the other hand, if the image file cannot be normally delivered, the image file is printed out by the printer 115 or delivered to another client.

As described above, by cancelling the plurality of files into each client and collectively delivering them, traffic on the LAN can be reduced, and further interruption of a client's work can be minimized.

In this case, as a method for judging whether the designated client exits, there are provided: a method for inquiring of the server machine 202 about existence of client's address, a method for registering the previously-existing address in the RAM 103 in the facsimile apparatus 201, and the like. In the present embodiment, the MAC address is judged by inquiring of the server machine 202, and the IP address is judged by referring to an IP address table, which stores therein the IP address previously registered in the RAM 103.

In a case where the address on the LAN is not set, or in a case where the set address does not exist, coincidence detection of pseudo address data is performed. The coincidence detection of pseudo address data is performed by searching a pseudo address data table which has been previously registered in the RAM 103 within the facsimile apparatus 201. In the present embodiment, the pseudo address data table stores therein the pseudo address data and a mail name, which is the address data on the LAN. In the pseudo address data table, the plurality of mail names can be registered, and all the equipment connected to the LAN can be registered.

If the coincidence detection is performed, the address analysis control terminates, on the other hand, if the coincidence detection is not performed, the address analysis is judged to be impossible, and the analysis control terminates.

In the above description, as the facsimile apparatus 201, the apparatus used is of a type which is directly connected to the LAN. However, the present invention is not limited to such a type.

For example, a facsimile apparatus of a type which is connected to a terminal on the LAN may be used, so as to cause the terminal to which the facsimile apparatus is connected to operate as the facsimile server for controlling and managing the facsimile apparatus.

In this case, by collectively sending the reception images to the facsimile server to which the facsimile apparatus 201 is connected, the facsimile server transmits the information, such as the address data of the series delivery destination stored in a BFT frame or the like, the communication information in the reception, and the like, to the server machine 202, in accordance with a predetermined format. Based on such data, the file server forms the reception notification mail in accordance with the protocol of the connected LAN, and then transfers the formed mail. such operations are controlled based on the application software of the facsimile server (i.e., terminal) to which the facsimile apparatus is connected.

Furthermore, in the above explanation, the reception notification control was performed by the facsimile apparatus 201. However, the present invention is not limited to this. For example, a possible operation is that destination information for transmitting the mail and the command file in which the message information is stored in the mail are transmitted to the terminal, such as the server machine 202 or the like, and the notification mail is automatically formed by the application software in the terminal to transmit it.

Furthermore, the reception image was stored in the memory of the server machine 202. However, the present invention is not limited to this. For example, the reception image may be stored in a hard disk connected to the LAN or a memory in a terminal connected to the LAN.

Furthermore, the protocol of the LAN is not limited to the TCP/IP protocol, but may be an IPX/SPX protocol, or the like.

Furthermore, the notification mail for notifying of the result in the reception operation is not limited to the above-described type, but may be, e.g., a notification mail which is transmitted only in a case where the communication failed.

Furthermore, the address analysis control is not limited to the above-described type, but may be performed by, e.g., a command data analysis unit for analyzing command data representing an address type and an object of use.

According to the above-described embodiments, the transmission data concerning the transmission requests from the clients on the LAN can be collectively transmitted to the same destination (i.e., telephone number) by using the BFT data format. In this case, by transmitting the data after restructuring it with distinguishing the control information from the image information, the file management and the delivery control in the reception side become more easy.

Furthermore, in the case where the plurality of image files are received, the plurality of reception notifications and the plurality of reception data deliveries can be collectively performed, whereby communication efficiency can be improved.

The present invention can be applied to a system constructed by a plurality of equipment (e.g., host computer, interface equipment, reader, printer and the like) or can be also applied to an apparatus comprising one piece of equipment (e.g., copy machine, facsimile machine).

The invention employed by a method whereby program codes of a software to realize the functions of the foregoing embodiments are supplied to a computer in an apparatus or a system connected to various devices, so as to make the devices operative, in order to realize that functions of the foregoing embodiments and the various devices are operated in accordance with the program stored in the computer (CPU or MPU) of the system or apparatus is also included in the scope of the present invention.

In such a case, the program codes of the software realize the functions of the foregoing embodiments and the program codes themselves and means for supplying the program codes to the computer, for example, a memory medium in which the program codes have been stored construct the present invention.

A possible memory media to store the program codes, for example, are a floppy disk, a hard disk, an optical disk, an optomagnetic disk, a CD-ROM, a magnetic tape, a nonvolatile memory card, a ROM or the like.

It is understood that the program codes are included in the embodiments of the present invention not only in a case where the functions of the foregoing embodiments are realized by executing the supplied program codes by the computer, but also a case where the functions of the foregoing embodiments are realized in cooperation with the OS (operating system) by which the program codes operate in the computer or another software application or the like.

It is understood that the present invention also incorporates a case where the supplied program codes are stored into a memory provided for a function-expansion board of a computer, or a function-expansion unit connected to a computer, and, after that, a CPU or the like provided for the function-expansion board or the functionexpansion unit executes a part or all of the actual processes on the basis of instructions of the program codes, and the functions of the foregoing embodiments are realized by the processes.

According to the first and second embodiments as explained above, the plurality of data receptions can be notified to the receiver on the LAN by one-time notification.

Furthermore, the reception data corresponding to the plurality of data receptions can be delivered to the receiver on the LAN at one time.

Furthermore, in the case where the data is sent to the partner's apparatus connected to the LAN, the data which concern the plurality of transmission requests and are to be sent to the same receiver can be transmitted at one time.

Therefore, communication efficiency, process efficiency and the like can be improved.

Although the present invention has been described above with respect to the preferred embodiments, the present invention is not limited to the foregoing embodiments but many modifications and variations are possible within the spirit and scope of the appended claims.

What is claimed is:

1. A data communication apparatus comprising:

interface means for connecting with a local area network (LAN);

reception means for receiving data from a transmitting side;

notification means for notifying a receiver on the LAN, via said interface means, of the fact that said reception means received the data; and management means for managing a plurality of data received individually by said reception means, for each notification destination to which the notification is performed by said notification means;

wherein said notification means forms a single mail for notifying that the reception means has received the plurality of data, each data having been received at a different time from one another, to the receiver on the LAN, and a received time and a partner's information for each data are added to the single mail, and wherein said notification means transmits the formed single mail to the receiver on the LAN before the receiver confirms the data received by said reception means, and further transmits a next mail which is not yet transmitted to the receiver on the LAN the next time.

2. An apparatus according to claim 1, further comprising:

determination means for determining whether or not an information for designating the receiver on the LAN is included in the data received from the transmitting side by said reception means; and specifying means for, in a case where said determination means determines that the information for designating the receiving on the LAN is included therein, specifying the receiver among a plurality of receivers on the LAN based on the information, said receiving being a notification destination for performing the notification by said notification means, wherein said notification means forms a mail for notifying that the reception means has received the data to a predetermined notification destination, in a case where said determination means determines that the information for designating the receiver on the LAN is not included in the data received by said reception means.

3. A data communication method for exchanging data between a local area network (LAN) and a communication line other than the LAN, said method comprising:

a reception step of receiving the data from a transmission side via the communication line;

a notification step of notifying to the fact that the data was received in said reception step to a receiver on the LAN; and a management step of managing a plurality of data received individually in said reception step, for each receiver to which the notification should be performed in said notification step;

wherein in said notification step, a single mail is formed, said mail notifying that the plurality of data has been received, each data having been received at a different time from one another, to the receiver on the LAN, and a received time and a partner's information for each date are added to the single mail, and wherein said notification step transmits the formed single mail to the receiver on the LAN before the receiver confirms the data received in said reception step, and further transmits a next mail which is not yet transmitted to the receiver on the LAN, the next time.

4. A computer readable program stored in a storage medium comprising:

a reception step of receiving data from a transmission side via a communication line;

a notification step of notifying to the fact that the data was received in said reception step to a receiver on the LAN; and a management step of managing a plurality of data received individually in said reception step, for each receiver to which the notification should be performed in said notification step;

wherein in said notification step, a single mail is formed, said mail notifying that the plurality of data has been received, each data having been received at a different time from one another, to the receiver on the LAN, and a received time and a partner's information for each data are added to the single mail, and wherein said notification step transmits the formed single mail to the receiver on the LAN before the receiver confirms the data received in said reception step, and further transmits a next mail which is not yet transmitted to the receiver on the LAN, the next time.

* * * * *

UNITED STATES PATENT AND TRADEMARK OFFICE
CERTIFICATE OF CORRECTION

PATENT NO.    : 6,377,580 B2
DATED         : April 23, 2002
INVENTOR(S)   : Koichi Matsumoto et al.

It is certified that error appears in the above-identified patent and that said Letters Patent is hereby corrected as shown below:

Column 3,
Line 17, "point" should read -- (joint --

Column 15,
Line 15, "functionexpansion unit" should read -- function-expansion unit --
Line 60, "LAN the" should read -- LAN, the --

Signed and Sealed this

Twenty-fourth Day of September, 2002

Attest:

JAMES E. ROGAN
Attesting Officer
Director of the United States Patent and Trademark Office